US009733499B1

United States Patent
Ben Bakir et al.

(10) Patent No.: US 9,733,499 B1
(45) Date of Patent: Aug. 15, 2017

(54) SLOW LIGHT WAVEGUIDE

(71) Applicant: Commissariat A L'Energie Atomique et aux Energies Alternatives, Paris (FR)

(72) Inventors: Badhise Ben Bakir, Brezins (FR); Karim Hassan, Voiron (FR)

(73) Assignee: Commissariat à L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 15/434,469

(22) Filed: Feb. 16, 2017

(30) Foreign Application Priority Data

Mar. 17, 2016 (FR) ..................... 16 52259

(51) Int. Cl.
*G02B 6/12* (2006.01)
*G02F 1/025* (2006.01)
*G02F 1/01* (2006.01)
*G02B 6/122* (2006.01)
*G02F 1/015* (2006.01)

(52) U.S. Cl.
CPC ........... *G02F 1/025* (2013.01); *G02B 6/1228* (2013.01); *G02F 1/0147* (2013.01); *G02F 2001/0156* (2013.01); *G02F 2201/06* (2013.01); *G02F 2203/07* (2013.01)

(58) Field of Classification Search
CPC ...... G02B 6/10; G02B 6/1226; G02B 6/1228; G02F 1/025; G02F 1/0147; G02F 2001/0156; G02F 2201/06; G02F 2203/07
See application file for complete search history.

(56) References Cited

U.S. PATENT DOCUMENTS

2009/0103875 A1* 4/2009 Shimizu ............... G02B 6/1221
385/131

FOREIGN PATENT DOCUMENTS

JP 2013-19515 9/2013

OTHER PUBLICATIONS

Pieliminary Search Report issued Dec. 113, 2016 FA 825746 (with English translation of c category of cited documents).
Corrado Sciancalepore, et al., Low-Loss Adiabatically-Tapered High-Contrast Gratings for Slow-Wave Modulators on SOI, Proc. of SPIE, Optical Sensing II, vol. 9372, XP55327395A, Feb. 2015, pp. 93720G-2-93720G-6.

(Continued)

*Primary Examiner* — Thomas A Hollweg
*Assistant Examiner* — Mary A El Shammaa
(74) *Attorney, Agent, or Firm* — Oblon, McClelland, Maier & Neustadt, L.L.P.

(57) ABSTRACT

This slow light waveguide includes an initial region which extends, along an optical axis, from a start starting from which the width of a central waveguide begins to continuously decrease up to an end beyond which the width of the central waveguide no longer decreases up to the end of a slowing section, this initial region overlapping a broadening region where the length of lateral teeth continuously increases, a final region which extends, along the optical axis, from a start starting from which the width of the central waveguide begins to continuously increase up to an end beyond which the width of the central waveguide no longer increases, this final region overlapping a narrowing region where the length of the lateral teeth continuously decreases.

12 Claims, 3 Drawing Sheets

(56) References Cited

OTHER PUBLICATIONS

A. Brimont, et al., "High speed silicon electro-optical modulators enhanced via slow light propagation", Oct. 2011, Optical Society of America, vol. 19, No. 21, Optics Express, XP55327121, pp. 20876-20885.
Christelle Monat, et al., "Slow light enhancement of nonlinear effects in silicon engineered photonic crystal waveguides", Feb. 2009, vol. 17, No. 4, Optics Express, XP55327409A, pp. 2944-2953.
Shayan Mookherjea, et al. "Localization in silicon nanophotonic slow-light waveguides", Nature Photonics, vol. 2, Feb. 2008, pp. 90-93.
Amrita Debnath, et al., "Extraction of group index of lossy photonic crystal waveguides", Jan. 5, 2015, vol. 40, No. 2, Optics Letters, pp. 193-196.

\* cited by examiner

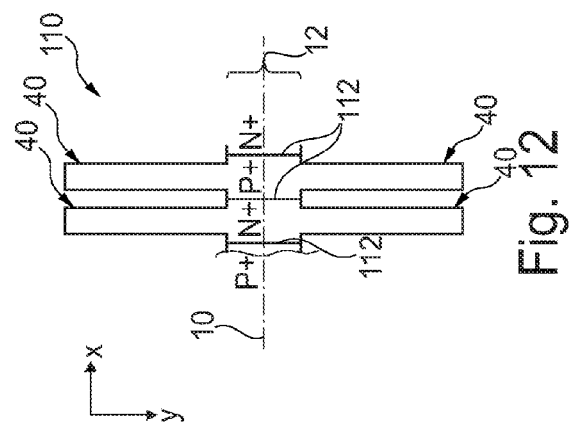
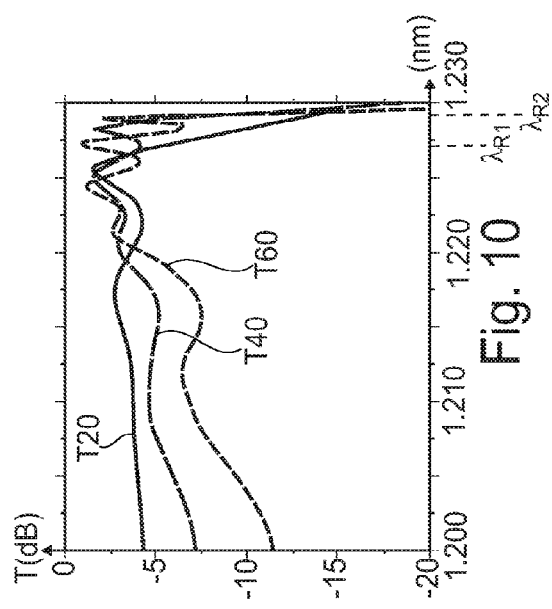
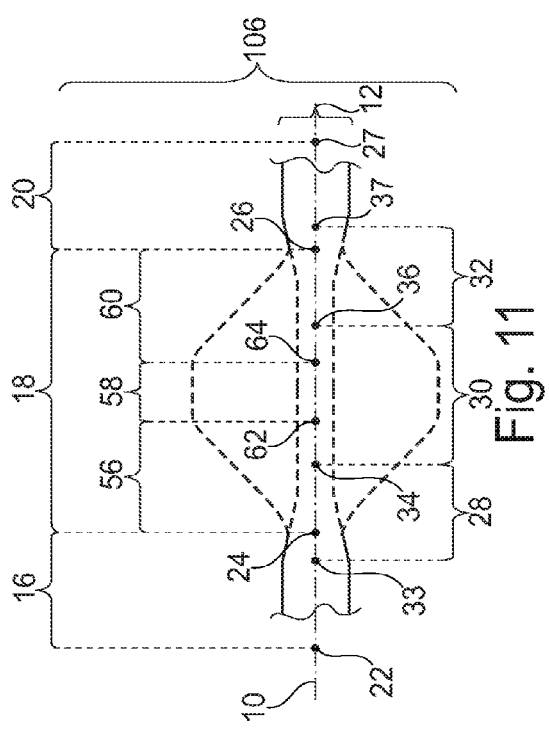
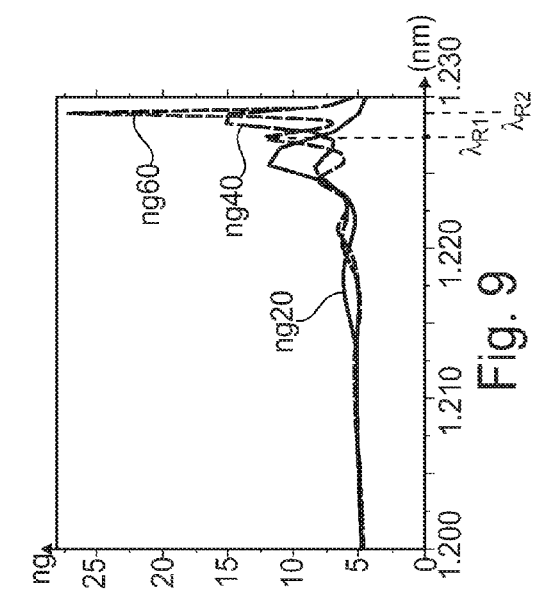

SLOW LIGHT WAVEGUIDE

The subject of the invention is a slow light waveguide designed to slow the propagation of an optical signal that it is guiding. Another subject of the invention is a semiconductor modulator of the phase or of the amplitude of an optical signal incorporating this slow light waveguide.

The use of a slow light waveguide is for example advantageous in phase or amplitude modulators for optical signals. Indeed, this allows the efficiency of the modulation of these modulators to be improved.

Known slow light waveguides comprise:
- a substrate which extends essentially in a plane referred to as "substrate plane",
- an optical axis tangent at any point to the direction of propagation of the optical signal inside of the slow light waveguide, this optical axis extending in a plane parallel to the substrate plane,
- a slowing section designed to slow the propagation of the optical signal, this section comprising, for this purpose, lateral teeth disposed symmetrically on either side of the optical axis with a regular pitch p along the optical axis from the start of this slowing section up to its end, each lateral tooth extending continuously in a direction of extension parallel to the substrate plane, from a proximal end up to a distal end which constitutes the part of the lateral tooth furthest from the optical axis and each lateral tooth comprising a point of intersection between its direction of extension and the optical axis, the length of each lateral tooth being equal to the shortest distance between the optical axis and its distal end,
- a central waveguide which extends along the optical axis and which comprises lateral sidewalls on either side of the optical axis, the width of the central waveguide, inside of the slowing section, only being defined between two immediately consecutive lateral teeth and taken equal to the shortest distance, measured in a transverse direction parallel to the substrate plane and perpendicular to the optical axis, between the lateral sidewalls of the central waveguide situated on either side of the optical axis and between these consecutive lateral teeth,
- a broadening region extending along the optical axis, over a distance greater than $d_{min}$ from a start, coinciding with the start of the slowing section, up to an end situated inside of the slowing section, the distance $d_{min}$ being a distance equal to the greater of the wavelength $\lambda$ of the optical signal and of 5p, where p is the pitch between the lateral teeth, the length of the lateral teeth situated inside of the broadening region continuously increasing going from the start up to the end of this broadening region, the distal ends of all the lateral teeth situated on the same side of the optical axis inside of this broadening region all being situated, for this purpose, on a curve getting continuously further from the optical axis, the length of the lateral tooth situated just after the end of the broadening region being equal to or less than the length of the last lateral tooth situated inside of this broadening region,
- a narrowing region which extends along the optical axis over a distance greater than $d_{min}$ from a start, situated inside of the slowing section, up to an end coinciding with the end of the slowing section, the length of the lateral teeth situated inside of the narrowing region continuously decreasing going from the start up to the end of this narrowing region, the distal ends of all the lateral teeth situated on the same side of the optical axis inside of this narrowing region all being situated, for this purpose, on a curve getting continuously closer to the optical axis, the length of the lateral tooth situated just before the start of the narrowing region being equal to or less than the length of the first lateral tooth situated inside of this narrowing region.

Such slow light waveguides are for example described in the following documents:

A1: A. Brimont et al., "High speed silicon electro-optical modulators enhanced via slow light propagation", Optics express 20876, 10 Oct. 2011, Vol 19, No. 21;

A2: Shayan Mookherjea et al., "Localisation in silicon nanophotonic slow—light waveguides", Nature photonics, Vol 2, February 2008, Corrado Sciancalepore et al.: "Low-Loss adiabatically-tapered high-contrast gratings for slow-wave modulators on SOI", Optical Sensing II, Vol. 9372, 27 Feb. 2015, page 93720G, Christelle Monat et al.: "Slow light enhancement of nonlinear effects in silicon engineered photonic crystal waveguide 4/Optics express 2944", Opt. Express, 12 Feb. 2009, pages 2945-2953,

JP2013195715A.

In the following, the first two articles of this list are denoted using the respective terms article A1 and article A2.

The known slow light waveguides exhibit:
- either operating points where the slowing of the optical signal and the losses in transmission are significant,
- or operating points where the slowing of the optical signal and the losses in transmission are reduced.

The known slow light waveguides also exhibit a narrow photonic band gap.

The objective is therefore to improve the known slow light waveguides on at least one of the following points:
- provide a slow light waveguide which exhibits operating points where the slowing of the optical signal is just as good as with the known slow light waveguides but exhibiting reduced transmission losses,
- provide a slow light waveguide which exhibits operating points where the slowing of the optical signal is better than with the known slow light waveguides and the transmission losses are equal to those observed with these known slow light waveguides,
- provide slow light waveguides whose photonic band gap is wider than that observed in the known slow light waveguides.

Its subject is accordingly a slow light waveguide according to claim 1.

By virtue of the overlapping of the broadening region and of the initial region, combined with the overlapping of the narrowing region with the final region, the slow light waveguide claimed offers the following advantages:

1) The photonic band gap is wider than in the absence of the initial and final regions.
2) With respect to a known slow light waveguide, the slow light waveguide claimed exhibits, on either side of the photonic band gap, the operating points for which the transmission losses are identical to those of the known slow light waveguides while at the same time exhibiting a greater slowing of the optical signal.
3) The slow light waveguide claimed also exhibits, on either side of the photonic band gap, operating points for which the slowing of the optical signal is the same as that obtained with the known slow light waveguides, but with lower transmission losses.

Lastly, on either side of the photonic band gap of the slow light waveguide claimed, the variation of the transmission losses as a function of the wavelength oscillates less than in the known slow light waveguides.

The embodiments of this slow light waveguide may exhibit one or more of the features of the dependent claims.

These embodiments of the slow light waveguide furthermore offer the following advantages:

when the length of the slowing section is greater than 50 µm, the slowing of the optical signal is improved and/or the transmission losses are reduced.

Another subject of the invention is a semiconductor modulator of the phase or of the amplitude of an optical signal, this modulator comprising the slow light waveguide claimed.

The invention will be better understood upon reading the description that follows, given solely by way of non-limiting example and presented with reference to the drawings in which:

FIG. 9 is a graph illustrating the variation, as a function of the wavelength, of the group index in three different scenarios;

FIG. 10 is a graph illustrating the variation of the transmission losses, as a function of the wavelength, in the same three scenarios as those taken into account in FIG. 9;

FIG. 11 is a schematic illustration of a second possible embodiment of a slow light waveguide, and FIG. 12 is a schematic illustration of a third possible embodiment of a slow light waveguide.

Figure 1:
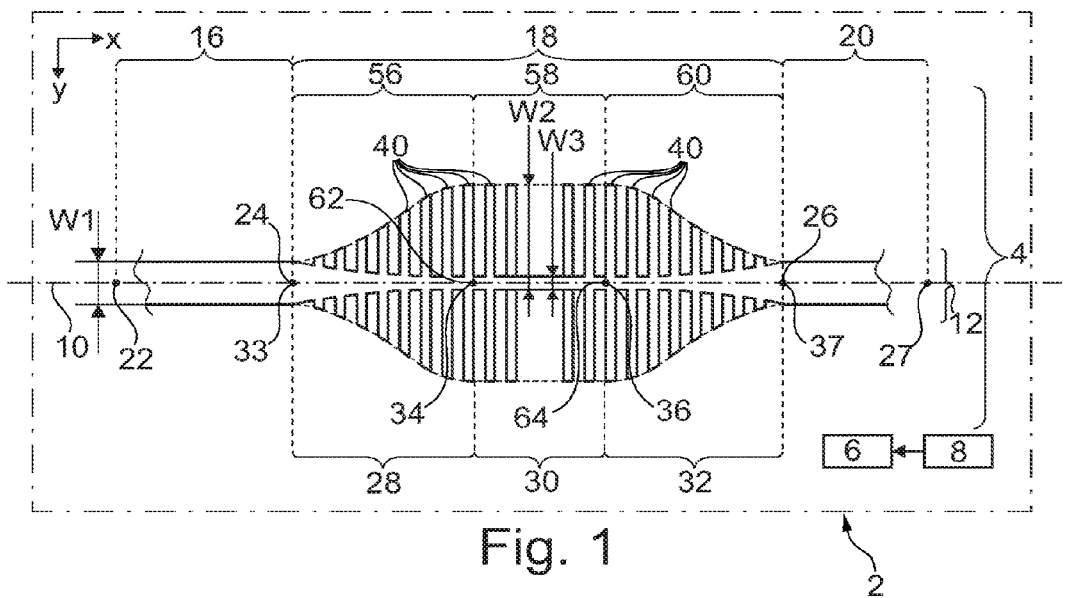
FIG. 1 is a schematic and partial illustration, as a top view, of a modulator comprising a slow light waveguide.

FIG. 1 shows a semiconductor modulator 2 designed to modulate the phase and/or the amplitude of an optical signal. For example, the wavelength $\lambda$ of the optical signal is in the range between 1250 nm and 1590 nm. For example, the wavelength $\lambda$ is chosen equal to 1310 nm.

Here, the modulator 2 modulates the amplitude of the optical signal. For this purpose, in this exemplary embodiment, it comprises a Mach-Zender interferometer. The Mach-Zender interferometer comprises two branches whose outputs are combined together in order to obtain the optical signal modulated in phase. At least one of these branches comprises a slow light waveguide in order to improve the efficiency of the modulation and to reduce the size of the modulator 2. The general architecture of such a modulator is well known and will not therefore be described here in detail. For example, for further information on the general architecture of such a modulator, the reader may consult the article A1.

Thus, in the following, only the details necessary for the understanding of the invention are described. In order to simplify FIG. 1, the architecture of the Mach-Zender interferometer has not been shown and only the slow light waveguide 4 is shown.

The modulator 2 also comprises:

a controllable heater 6 for modifying the temperature of the guide 4, and an electronic circuit 8 for controlling the heater 6.

The heater 6 heats the guide 4 in response to an electrical control signal. Heating the guide 4 allows the refractive index of the guide 4 to be modified. By doing this, it is possible to modify the value $\lambda_R$ which corresponds to a particular operating point of the guide 4. Some examples of such operating points are described further on with reference to FIGS. 9 and 10. The architecture of such a heater is well known and will not therefore be described here. Typically, this heater 6 is situated on top of the guide 4. Typically, it comprises an electrical heating element which converts the current flowing through it into heat. Here, the guide 4 is made of silicon and preferably single-crystal silicon.

The electronic circuit 8 generates the electrical control signal for the heater 6. Typically, the electrical control signal generated by this circuit 8 allows the value $\lambda_R$ to be moved until it is equal to the wavelength $\lambda$ of the optical signal to be modulated, then to maintain this equality. For example, in order to do this, the circuit 8 receives information which is representative of the wavelength of the optical signal to be modulated and, as a function of this information, it automatically selects, from within a pre-recorded table, the characteristic(s) of the control signal to be generated in order to make the value $\lambda_R$ correspond with the wavelength $\lambda$.

In FIG. 1, the guide 4 is shown as a top view in the particular case where the substrate on which it is formed essentially extends in a horizontal plane referred to as "substrate plane". In FIG. 1 and in the following figures, the horizontal is identified by two directions X and Y of an orthogonal reference frame XYZ. The direction Z of this reference frame corresponds to the vertical direction. In addition, in these figures, the direction X is chosen to be parallel to the direction of propagation of the optical signal inside of the guide 4. In FIG. 1, the wavy lines which run mainly in the direction Y indicate that only a part of the guide 4 has been shown.

In the guide 4, the optical signal propagates along a rectilinear optical axis 10 parallel to the direction X. For this purpose, the guide 4 comprises a central waveguide 12 which extends along the axis 10 successively passing through:

an input section 16 inside of which the guide 4 lacks any specific arrangement for slowing the optical signal, a slowing section 18 inside of which the guide 4 is configured for slowing the optical signal, and an output section 20 inside of which the guide 4 lacks any specific arrangement for slowing the optical signal.

Each of these sections is for example a rectangular horizontal area having two sides parallel to the direction Y.

Along the axis 10, each of these sections extends in the direction X from a start up to an end. These sections are immediately consecutive in the direction X in such a manner that the end of a preceding section coincides with the start of the following section. The start and the end of the sections 16 and 20 are identified, in FIG. 1, by points denoted by the respective numerical references 22, 24, 26 and 27. Thus, the start and the end of the slowing section 18 respectively carry the numerical references 24 and 26.

Here, the waveguide 12 has a structure known by the terminology "Rib waveguide". In other words, the guide 12 is formed:

from a parallelepipedic slab 22 (FIGS. 3 and 4) made of silicon which extends continuously along the axis 10, and from a silicon strip 24 formed on the slab 22 and centred on the axis 10.

The strip 24 forms a rectilinear rib on the slab 22.

Here, the width of the slab 22 in the direction Y is constant and strictly greater than the width of the strip 24 in this same direction.

In the following, the term "width" of the guide 12 is intended to denote the width of the strip 24 measured in the direction Y. More precisely, in the sections 16 and 20, "width" of the guide 12 denotes the shortest distance, measured in the direction Y, between vertical lateral sidewalls of the strip 24. In the section 18, the width of the guide 12 can only be measured at a location situated between two consecutive teeth 40 in the direction X. Thus, in the section 18, the width of the guide 12 is only defined between two immediately consecutive teeth 40. Between two immediately consecutive teeth 40, the width of the guide 12 is taken equal to the shortest distance, measured in the direction Y, between the lateral sidewalls of the guide 12 situated on either side of the axis 10 and between these two consecutive teeth 40. In other words, the width of the guide 12 between two consecutive teeth 40 is defined as being equal to the smallest width, in the direction Y, of the guide 4 between these two teeth 40. The teeth 40 are described hereinbelow.

In FIG. 1, only the part of the guide 12 corresponding to the strip 24 is shown. The transverse section of the guide 12 is described in more detail with reference to FIGS. 3 and 4. Moreover, the slow light waveguide 4 is symmetrical with respect to a vertical longitudinal plane PL (FIGS. 3 and 4) containing the axis 10. As a consequence, in the following, only the part of the guide 4 situated on the left-hand side of this plane PL is described in detail.

Here, inside of the sections 16 and 20, the width of the guide 12 is constant and equal to W1. For example, W1 is in the range between 200 nm and 1 µm. For example, the length of the guide 12, in the direction X, inside of the sections 16 and 20, is greater than $\lambda$, or $3\lambda$ or $5\lambda$, where $\lambda$ is the wavelength of the optical signal propagating within the guide 4.

The slowing section 18 extends along the axis 10 over a length $L_{18}$. Typically, $L_{18}$ is greater than 10 µm or 20 µm or 50 µm and, generally, less than 1 mm or 6 mm.

Between the end 24 of the section 16 and the start 26 of the section 20, the guide 12 comprises, successively, along the axis 10: an initial region 28, a central region 30 and a final region 32. The regions 28, 30 and 32 are rectangular horizontal regions, two of the sides of which are perpendicular to the axis 10.

The region 28 extends, along the axis 10, from a start 33 up to an end 34. Here, the start 33 coincides with the start 24 of the section 18. The end 34 is represented in FIG. 1 by a point situated at the intersection of one side of the region 28 and of the axis 10. The end 34 is situated inside of the slowing section 18.

The final region 32 runs, along the axis 10, from a start 36 up to an end 37. Here, the end 37 coincides with the end 26. The start 36 is situated inside of the section 18.

The start and the end of the central region 30 coincide, respectively, with the end 34 and the start 36. Thus, in the following, the numerical references 34 and 36 are also used to denote, respectively, the start and the end of the central region 30.

In this first embodiment, the guide 4 is symmetrical with respect to a vertical median plane perpendicular to the axis 10 and which intersects the axis 10 in the middle of the section 18. As a consequence, the regions 28 and 30 are symmetrical to each other with respect to this plane and the region 30 is not described in more detail.

Each of the regions 28, 30 and 32 extends along the axis 10 over a distance greater than $d_{min}$ and, preferably, greater than $2d_{min}$ or $5d_{min}$. $d_{min}$ is defined by the following relationship: $d_{min}=Max[\lambda; 5p]$ where:

Max[ . . . ] is the function that returns the largest of the values listed between the square brackets, $\lambda$ is the wavelength of the optical signal, and p is the pitch between the teeth 40 and will be described hereinbelow.

For example, here, the length of the regions 28, 30 and 32 is greater than 5 µm and, preferably, greater than 20 µm.

Inside of the region 28, the width of the guide 12 decreases progressively and monotonically and continuously from a width equal to W1 down to a width equal to W3. Preferably, W3 is 1.3 times or 2 times smaller than W1. For this reason, the vertical lateral sidewalls of the guide 12 inside of the region 28 are disposed along a lateral limit which is getting continuously closer to the axis 10 going from the start 33 up to the end 34. The orthogonal projection of this limit in a horizontal plane forms a curve. This curve gets continuously closer to the axis 10 going from the start 33 up to the end 34 without having any point of inflexion. Numerous shapes are possible for this curve and hence for the lateral limit inside of the region 28. For example, here, this curve is identical to the decreasing part of the Blackman apodization function. However, other curves are possible such as for example a decreasing straight line or a decreasing exponential or other curve.

Just before the start 33, the width of the guide 12 does not decrease; here, it is constant. Just after the end 34, the width of the guide 12 no longer decreases.

Inside of the region 30, the width of the guide 12 is constant and equal to W3.

The slowing section 18 comprises the lateral teeth 40 disposed periodically in the direction X in such a manner as to slow down the propagation of the optical signal in this direction. In order to simplify FIG. 1, the reference 40 has only been indicated for some of the teeth shown in this figure. An enlargement of such a tooth 40 can also be seen in FIG. 2.

Each tooth 40 extends, in a direction 41 (FIG. 2) of extension, from a proximal end 42 up to a distal end 44. Typically, the direction 41 is centred on the tooth 40 and goes through the geometrical centre of this tooth 40. The geometrical centre of a tooth is the barycentre of all the points belonging to this tooth assigning the same weight to each of these points. The directions 41 of the teeth 40 situated on the same side of the axis 10 are parallel to one another; here, the direction 41 is substantially parallel to the direction Y. Thus, in this embodiment, the angle $\alpha$ between the direction 41 and the axis 10 is equal to 90° to within 3° or to within 5°. The proximal end 42 is anchored into the lateral sidewalls of the guide 12 and situated on the lateral limit of this guide 12. Thus, the lateral sidewall of the guide 12 situated between two consecutive teeth 40 connects the proximal ends 42 of these two teeth. Accordingly, it extends from one proximal end 42 up to the next in the direction X.

The teeth 40 are made of silicon within the same layer of silicon as that used to form the strip 24. Thus, each tooth 40 only forms a single block of material with the guide 12.

Each tooth 40 comprises a respective point 46 of intersection between its direction 41 of extension and the axis 10.

Here, each tooth 40 comprises two vertical lateral sidewalls 50, 52 which each extend from the proximal end 42 up to the distal end 44. Here, these sidewalls 50 and 52 are flat and both are parallel to the direction Y. In this embodiment, the distal end 44 is also plane. It is formed by a vertical plane parallel to the direction X. Thus, the horizontal cross section of a tooth 40 is rectangular.

The width $l_D$ of the teeth 40 in the direction X is constant. For example, the width $l_D$ is in the range between p/5 and p/(1.2) and, preferably, equal to p/2.

The length of a tooth 40 here is defined as being the shortest distance, in the direction Y, between the axis 10 and the distal end 44 of this tooth.

The teeth 40 are disposed with a regular pitch p in the direction X on either side of the axis 10. The pitch p is equal to the distance that separates two points 46 of intersection that are immediately consecutive along the axis 10. The pitch p is less than $\lambda/n_{eff}$ and, preferably, less than $\lambda/(2n_{eff})$, or $\lambda/(4n_{eff})$ where $n_{eff}$ is the effective index of propagation of the optical mode propagating in the guide 4. The index $n_{eff}$ is also known by the name "phase constant of the mode". It is defined by the following relationship: $n_g=n_{eff}-\lambda dn_{eff}/d\lambda$, where $n_g$ is the group index.

The pitch p is generally greater than 50 nm. Here, for digital applications, the pitch p is taken equal to 210 nm.

The filling factor of the section 18 is defined as being equal to the ratio S1/S2 where:
- S1 is the surface area of the orthogonal projection of the section 18 onto a horizontal plane, in other words the surface area of the orthogonal projection of the parts of the guide 4 made of silicon and situated inside of the section 18, and
- S2 is the surface area of the orthogonal projection of the smallest convex envelope that totally contains the orthogonal projection of the section 18 on this same horizontal plane.

Thus, the lower the filling factor, the smaller the surface area of silicon inside of the section 18. Typically, the filling factor is in the range between 0.25 and 0.75 or between 0.45 and 0.55. Here, the filling factor is chosen to be equal to 0.5.

The section 18 comprises three immediately consecutive horizontal regions going in the direction X: a broadening region 56, an intermediate region 58 and a narrowing region 60. These regions 56, 58 and 60 are rectangular with two sides parallel to the direction Y.

The region 56 extends in the direction X from the start 24 up to an end 62. The region 60 extends in the direction X from a start 64 up to the end 26. The start of the region 58 coincides with the end 62 and hence carries the same numerical reference. The end of the region 58 coincides with the start 64 and hence carries the same numerical reference.

Each of these regions 56, 58 and 60 extends along the axis 10 over a distance greater than $d_{min}$ and, preferably, greater than $2d_{min}$ or $5d_{min}$.

In this particular embodiment, the regions 56, 58 and 60 are respectively identical to the regions 28, 30 and 32. Thus, the starts 24 and 33 coincide, the ends 34 and 62 coincide, the starts 36 and 64 coincide and the ends 26 and 37 coincide.

The length of the teeth 40 situated inside of the region 56 progressively increases, monotonically and continuously, going from the start 24 up to the end 62. Here, it is considered that a tooth 40 is situated inside of a region if its point of intersection 46 is included between the start and the end of this region. In the following, the expression "the tooth of the region" means the tooth situated inside of this region.

For this purpose, the distal ends 44 of each of the teeth 40 of the region 56 are situated on a horizontal curve which is getting monotonically and continuously further from the axis 10 going from the start 24 up to the end 62. Many different shapes are possible for this curve. For example, it could be a straight line. Here, this curve is the increasing part of a Blackman apodization function. Here, the length of the last tooth 40 of the region 56 is equal to W2. Typically, W2 is less than or equal to $2\lambda$ or $5\lambda$. W2 is also strictly greater than W1/2 and, advantageously, greater than W1.

Beyond the region 56, the length of the teeth 40 is no longer increasing. Thus, the teeth of the region 58 here all have a length equal to W2.

In this embodiment, the region 60 is symmetrical to the region 56 with respect to the median vertical plane and will not therefore be described in more detail.

Figures 2, 3:
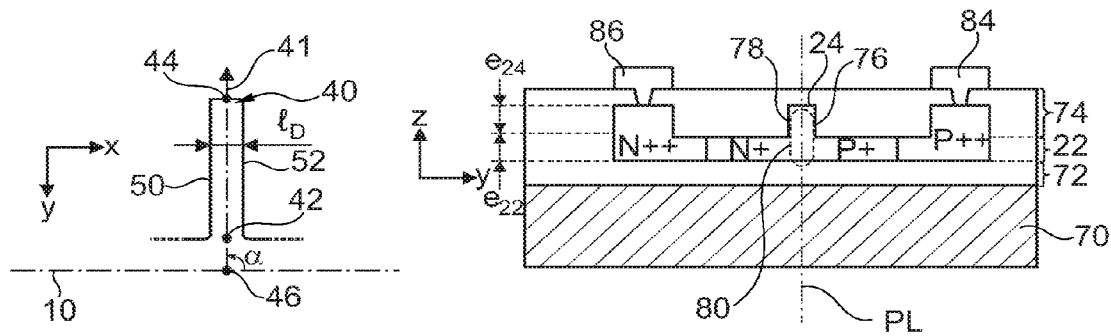
FIG. 2 is a schematic and partial illustration, as a top view, of one tooth of the slow light waveguide in FIG. 1.
FIGS. 3 and 4 are schematic illustrations, as transverse cross sections at two different places, of the slow light waveguide in FIG. 1.

FIG. 3 shows a vertical cross section, parallel to the plane YZ, which cuts across the guide 4 between two teeth 40. The guide 4 is formed on a substrate 70 which extends principally in a horizontal plane. The thickness of the substrate 70 is typically greater than 100 μm or 200 μm. For example, the substrate 70 is made of silicon.

A layer 72 of silicon dioxide ($SiO_2$) is formed directly on the substrate 70.

The guide 4 is formed from single-crystal silicon directly on the layer 72. Here, the guide 4 is encapsulated inside another layer 74 of silicon dioxide. More precisely, the guide 4 comprises the rectangular slab 22 made of single-crystal silicon on which the strip 24 is formed which defines the width of the guide 12. Typically, the vertical cross sections of the slab 22 and of the strip 24 are rectangular. In FIG. 3, the vertical lateral sidewalls of the guide 12 situated on either side of the axis 10 are denoted by the numerical references 76 and 78. In practice, because of imperfections in the process of fabrication of the guide 4, the vertical sidewalls are not perfectly vertical. For example, the angle between the vertical and the horizontal sidewalls is in the range between 80° and 90°. In the figures, these imperfections have not been shown.

The thickness $e_{22}$ of the slab 22 is generally less than or equal to the thickness $e_{24}$ of the strip 24. For example, the thicknesses $e_{22}$ and $e_{24}$ are generally less than or equal to 500 nm or less than or equal to 250 nm. For the numerical simulations given here, these thicknesses $e_{22}$ and $e_{24}$ are both chosen equal to 150 nm.

In order to rapidly modify the refractive index $n_f$ of the guide 12 in response to an electrical control signal, the guide 12 comprises a vertical PN (Positive-Negative) junction 80 situated in the longitudinal plane PL. For example, the junction 80 extends continuously from the start 24 up to the end 26. In order to form the junction 80, the areas of the guide 4 situated to the left of the plane PL are P doped (symbol "P+" in the FIGS. 3 and 4) and the areas of the guide 4 situated to the right of this plane are N doped (symbol "N+" in FIGS. 3 and 4).

In order to make the density of the charge carriers vary on the junction 80, the P-doped areas are electrically connected to one or more contact areas 84 and the N-doped areas are electrically connected to one or more contact areas 86.

By applying a potential difference between the contacts 84 and 86, the phase of the optical signal propagating in the guide 4 is modified.

Preferably, the areas of the guide 4 furthest from the longitudinal plane PL and which are directly in mechanical and electrical contact with the contacts 84 and 86 are more heavily doped (symbol "P++" and "N++", respectively, in FIGS. 3 and 4) than the areas closer to the plane PL.

Figure 4:
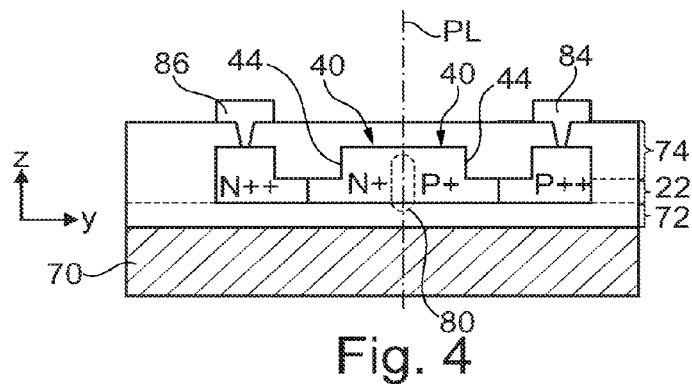

FIG. 4 shows a vertical cross section, parallel to the plane YZ, of the guide 4 on a pair of teeth 40. This figure allows the two teeth 40, symmetrical to one another with respect to the plane PL, to be seen in vertical cross section.

FIGS. 5 to 8 show the variation of the group index $n_g$ and the variation of the transmission losses through the guide 4 as a function of the wavelength $\lambda$ of the optical signal propagating in this guide. On these graphs:

the curve which represents the variation of the index $n_g$ as a function of the wavelength λ is denoted by the symbol "$n_g$", the curve which represents the variation of the transmission losses as a function of the wavelength λ is identified by the symbol "T", the abscissa axis is graduated in nanometers, the ordinate axis situated on the left represents the value of the transmission losses, the ordinate axis situated on the right represents the value of the index $n_g$, and the hatched rectangle in the centre of these graphs represents the photonic band gap of the guide 4.

The graphs in FIGS. 5 to 8 have been obtained by numerical simulation for various values of the parameters of the guide 4. More precisely, the value of the index $n_g$ has been obtained by implementing the method described in the following article:

A. Debnath et al., "Extraction of group index of lossy photonic crystal waveguides", Optics Letters 193, 9 Jan. 2015, Vol 40, no 2.

It is recalled that the higher the index $n_g$, the greater the slowing of the optical signal in the slow light waveguide ($n_g=c/v_g$, where c is the speed of light and $v_g$ the group velocity).

Figure 5:
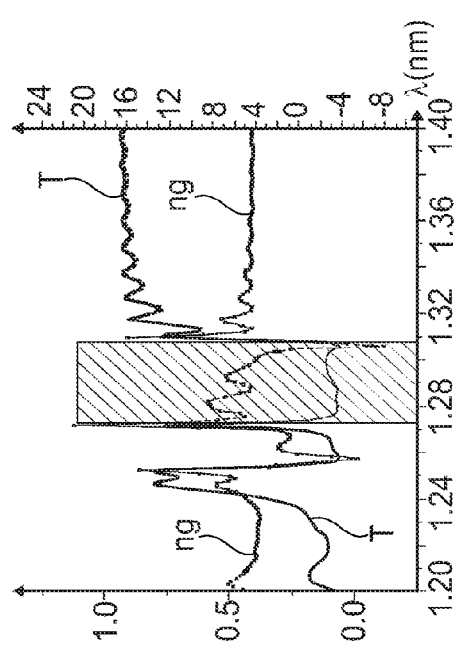

The graph in FIG. 5 has been obtained in the case where:
the length $L_{18}$ of the section 18 is equal to 20 μm,
W2=2000 nm,
W1=W3=400 nm (thus the regions 28 and 32 are omitted),
the regions 56 and 60 are omitted.

Since the regions 28 and 32 are not implemented, this case corresponds to a known case of the prior art. In this case, it is observed that it is possible to achieve high indices $n_g$, in other words higher than 10 on either side of the photonic band gap. However, the transmission losses oscillate strongly on the right of the photonic band gap and are significant close to the photonic band gap (hatched area).

Figure 6:
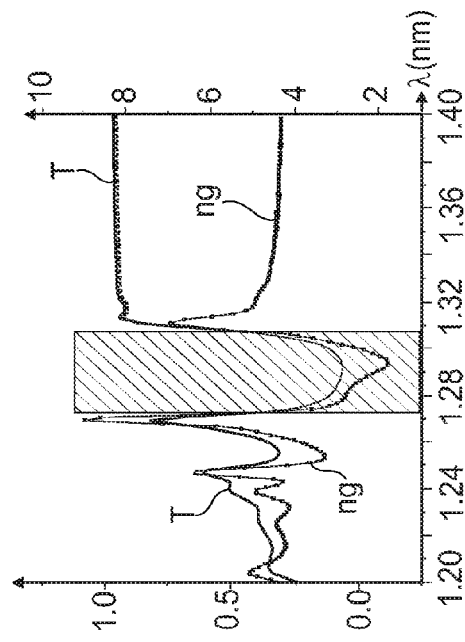
FIGS. 5 to 8 are graphs illustrating the variation, as a function of the wavelength, of the group index and of the transmission losses in various scenarios.

The graph in FIG. 6 has been obtained in the case where:
the length $L_{18}$ of the section 18 is equal to 20 μm,
W2=2000 nm,
W1=W3=400 nm (thus the regions 28 and 32 are omitted),
the regions 56 and 60 are present.

The graph in FIG. 6 therefore also illustrates results obtained in the absence of implementation of the regions 28 and 32 and hence corresponds to a known architecture of the prior art. In this case, it is observed that the oscillations of the transmission losses near to the edges of the photonic band gap are greatly reduced. On the other hand, the maximum values of the index $n_g$ on the left and on the right of the photonic band gap are also greatly reduced. Here, these maximum values are now less than 9.

Figure 7:
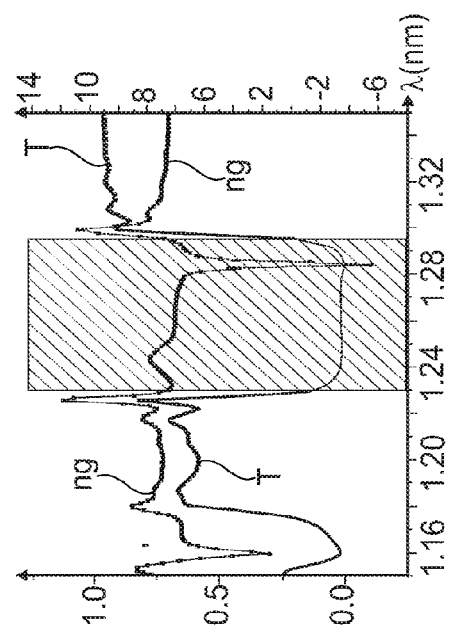

The graph in FIG. 7 has been obtained in the case where:
the length $L_{18}$ of the section 18 is equal to 20 μm,
W2=2000 nm,
W1=400 nm and W3=200 nm,
the regions 28, 32, 56 and 60 are present and the regions 30 and 58 are omitted (their length is zero).

In this case, the regions 28, 32, 56 and 60 are simultaneously implemented. This results in a significant increase in the maximum values of the index $n_g$ close to the right and left edges of the photonic band gap with respect to the case of FIG. 6. Moreover, this increase is obtained while conserving oscillations of the transmission losses on the right and left edges of the photonic band gap much weaker than those observed in the case of FIG. 5. Lastly, a significant broadening of the photonic band gap is observed.

Figure 8:
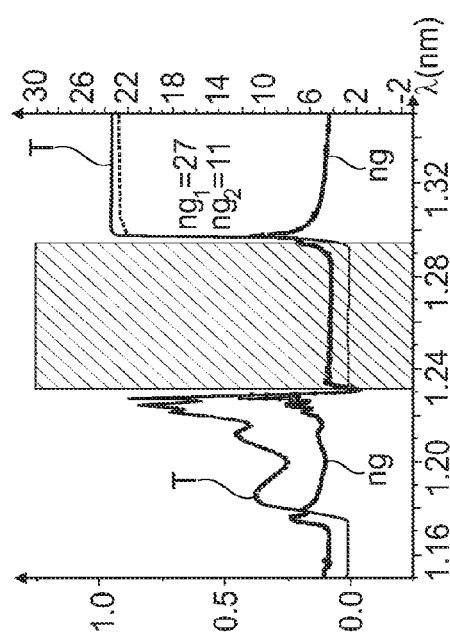

The graph in FIG. 8 has been obtained in the case where:
the length $L_{18}$ of the section 18 is equal to 60 μm,
W2=2000 nm,
W1=400 nm and W3=200 nm,
the regions 28, 32, 56 and 60 are present and the regions 30 and 58 are omitted.

In this case also, the regions 28, 32, 56 and 60 are simultaneously implemented. It is observed that the increase in the length $L_{18}$ results in an increase in maximum values of the index $n_g$ on the right-hand and left-hand edges of the photonic band gap with respect to the case in FIG. 7. In addition, the oscillations of the transmission losses on the right of the photonic band gap are eliminated and the amplitude of these oscillations on the left of the photonic band gap is limited.

FIG. 9 shows the variation of the value of the index $n_g$ as a function of the wavelength of the optical signal in the part situated on the left of the photonic band gap. On this graph, as on the graph in FIG. 10, the left-hand edge of the photonic band gap starts at 1.23 μm. The curves $n_{g20}$ and $n_{g60}$ correspond to the values of the index $n_g$ in the same configurations as those described for the FIGS. 7 and 8, respectively. The curve $n_{g40}$ corresponds to the same configuration of the slow light waveguide as that described in the case in FIG. 7 but with a length $L_{18}$ of 40 μm for the section 18.

FIG. 10 shows the variation of the value of the transmission losses as a function of the wavelength of the optical signal in the part situated on the left of the photonic band gap. On this graph, the lower the transmission losses, the closer the value is to 0. The curves T20, T40 and T60 correspond, respectively, to the same configurations of the slow light waveguide as those described for the curves $n_{g20}$, $n_{g40}$ and $n_{g60}$.

It is noted that, in the case where the section 18 has a length of 60 μm, the following operating points may be obtained for the slow light waveguide:
first operating point: $λ_{R1}$=1.2275 μm, $n_g$=12 and the transmission losses are less than 1 dB,
second operating point: $λ_{R2}$=1.2285 μm, $n_g$>25 and the transmission losses are less than 2.5 dB.

These two operating points are better than those possible with the case described with reference to FIGS. 5 and 6. In particular, they allow both a significant slowing of the optical signal and a low transmission loss to be obtained.

By heating the slow light waveguide with the heater 6, this shifts the curves of the graphs in FIGS. 5 to 10 horizontally without modifying the profile of these curves. In other words, heating the guide 4 modifies the values $λ_R$, and $λ_{R2}$ of the first and second operating points but does not modify the value of the index $n_g$ and of the transmission losses of these first and second operating points.

Typically, the control circuit 8 is designed to heat the guide 4 until it reaches the desired operating point. For example, if it is desired to use the first operating point described previously, the circuit 8 drives the heater 6 until the point where the value $λ_{R1}$ is equal to the wavelength λ of the optical signal guided by the guide 4. Once the operating point has been reached, the circuit 8 controls the heater 6 so as to keep the operation of the guide 4 at this operating point.

FIG. 11 shows a slow light waveguide 100 able to be used in place of the guide 4 in the modulator 2. The guide 100 is identical to the guide 4 except that the regions 28, 30 and 32 no longer coincide with the regions 56, 58 and 60, respectively. More precisely, in the guide 100:

the region 28 starts before the region 56 and finishes before the end 62 of the region 56, the region 32 starts after the start 64 of the region 60 and finishes after the end 26 of the region 60, the region 30 starts before the start 62 of the region 58 and finishes after the end 64 of the region 58.

In FIG. 11, in order to simplify this figure, inside of the section 18, the teeth 40 have not been shown. Inside of this section 18, only the curves on which the distal ends 44 and the lateral limits of the guide 12 are situated have been shown by dashed lines.

FIG. 12 shows a part of a slow light waveguide 110 in which the junction 80 is replaced by a succession, in the direction X, of several junctions PN 112. Each of these junctions 112 is situated in a respective vertical plane parallel to the plane YZ. For this purpose, the P- and N-doped areas are distributed in an alternating fashion along the axis 10. Preferably, each doped area comprises at least one pair of teeth 40 symmetrical to each other with respect to the plane PL. Each zone doped area is for example electrically connected to an electrical potential by means of a contact area in a manner similar to what has been described with reference to FIGS. 3 and 4.

Numerous other embodiments are possible. For example, the slow light waveguide may be used in applications other than a phase or amplitude modulator for an optical signal. In this case, the PN junction specifically used to modify the density of charges inside of this slow light waveguide may be omitted. For example, the slow light waveguide does not then comprise any doped part. By way of example of another possible application, the use of the guide 4 as a filter may be mentioned. In this case, it is its capacity to halt the propagation of an optical signal inside of a photonic band gap that is exploited. In the case where the slow light waveguide is used, for example, as a filter, the structure of the slow light waveguide may be that known by the term "Strip waveguide". In other words, the slab 22 shown in FIGS. 3 and 4 may be omitted. Similarly, the electrical contact areas are omitted.

As a variant, the value W3 is equal to zero. Indeed, the optical signal can still propagate along the axis 10 even in this particular case because the distances between the teeth 40 are very short.

The slow light waveguide is not necessarily symmetrical with respect to the vertical median plane. For example, the initial region may be shorter or longer than the final region. Similarly, the broadening region may be shorter or longer than the narrowing region.

Irrespective of the embodiment, the central region may be omitted. Similarly, the intermediate region may also be omitted. In these cases, the end of the initial region coincides with the start of the final region and/or the end of the broadening region coincides with the start of the narrowing region.

As a variant, the angle between the direction 41 of extension of the teeth 40 and the axis 10 is different from 90°. For example, this angle is in the range between 30° and 150° or between 45° and 135°. Thus, in these embodiments, the teeth are inclined either forwards or backwards with respect to the direction of propagation of the optical signal.

The teeth 40 may have other shapes. In particular, it is not necessary for the horizontal cross section of these teeth to be rectangular. For example, the horizontal cross section of the tooth 40 may also be triangular. The tooth 40 may also have a horizontal cross section identical to that shown in the article A1 or A2.

The value W2 may be greater than 2λ. However, in this case, the part of the tooth 40 which extends beyond 2λ has very little influence on the operation of the slow light waveguide. Accordingly, when the value W2 is greater than 2λ, the teeth 40 may have any given length as long as it remains greater than 2λ. In particular, in this case, it is not necessary for all the teeth 40 situated inside of the intermediate region 58 to have the same length. For example, as a variant, the length of a tooth 40 of the intermediate region 58 is greater than the length of the tooth 40 immediately following it. Similarly, in this case, the teeth 40 whose lengths are greater than 2λ do not need to be symmetrical with respect to the plane PL.

As a variant, the junction 80 extends along the axis 10 over a distance greater or smaller than the length of the section 18. For example, in another embodiment, the junction 80 only extends from the start 34 up to the end 36 of the central region 30.

In another variant, the PN junction is replaced by a PIN (for "Positive Intrinsic Negative") junction such as that used in PIN diodes.

The overlap between the regions 28, 56 or the regions 30, 58 or the regions 32, 60 may be arranged in any given manner as long as the length of the overlap between these two regions, along the axis 10, is greater than $d_{min}$ or $2d_{min}$ or $5d_{min}$. For example, the regions 28, 30 and 32 may begin before or after the start of the regions 56, 58 and 60, respectively. Similarly, the regions 28, 30 and 32 may finish before or after the end of the regions 56, 58 and 60, respectively.

In another embodiment, several slow light waveguides such as those described hereinabove are connected in series with one another.

In the central region 30, the width of the central waveguide is not necessarily constant. For example, this width may vary periodically.

The slow light waveguide may be formed from materials other than silicon. For example, when the slow light waveguide is encapsulated in silicon dioxide, the guide 4 may be made of silicon nitride or of aluminium nitride or of germanium. Similarly, the slow light waveguide may be encapsulated in materials other than silicon dioxide. For example, when the guide 4 is made of silicon, it may be encapsulated in silicon nitride, $TiO_2$, $Al_2O_3$, or aluminium nitride, or alternatively in other materials such as chalcogenide materials.

As a variant, the same slow light waveguide is used to simultaneously slow down several optical signals having different wavelengths. For example, in this case, each different wavelength corresponds to a respective operating point of the slow light waveguide.

The invention claimed is:

1. A slow light waveguide designed to slow the propagation of an optical signal that it said waveguide is guiding, said waveguide comprising:

a substrate which extends essentially in a plane referred to as "substrate plane", an optical axis tangent at any point to the direction of propagation of the optical signal inside of the slow light waveguide, said optical axis extending in a plane parallel to the substrate plane, a slowing section designed to slow the propagation of the optical signal, said section comprising lateral teeth disposed symmetrically on either side of the optical axis with a regular pitch p along the optical axis from the start of said slowing section up to its end, each lateral tooth extending continuously in a direction of extension parallel to the substrate plane, from a proximal end up to a distal end which constitutes the part of the lateral tooth furthest from the optical axis and each lateral tooth comprising a point of intersection between its direction of extension and the optical axis, the length of each lateral tooth being equal to the shortest distance between the optical axis and its distal end, a central waveguide which extends along the optical axis and which comprises, on either side of the optical axis, lateral sidewalls, the width of the central waveguide, inside of the slowing section, only being defined between two immediately consecutive lateral teeth and taken equal to the shortest distance, measured in a transverse direction parallel to the substrate plane and perpendicular to the optical axis, between the lateral sidewalls of the central waveguide situated on either side of the optical axis and between these consecutive lateral teeth, a broadening region extending along the optical axis, over a distance greater than $d_{min}$ from a start, coinciding with the start of the slowing section, up to an end situated inside of the slowing section, the distance $d_{min}$ being a distance equal to the greater of the wavelength $\lambda$ of the optical signal and of 5p, where p is the pitch between the lateral teeth, the length of the lateral teeth situated inside of the broadening region continuously increasing going from the start up to the end of said broadening region, the distal ends of all the lateral teeth situated on the same side of the optical axis inside of said broadening region being all situated on a curve getting continuously further from the optical axis, the length of the lateral tooth situated just after the end of the broadening region being equal to or less than the length of the last lateral tooth situated inside of said broadening region, a narrowing region which extends along the optical axis over a distance greater than $d_{min}$ from a start, situated inside of the slowing section, up to an end coinciding with the end of the slowing section, the length of the lateral teeth situated inside of the narrowing region, continuously decreasing going from the start up to the end of said narrowing region, the distal ends of all the lateral teeth situated on the same side of the optical axis inside of said narrowing region being all situated on a curve getting continuously closer to the optical axis, the length of the lateral tooth situated just before the start of the narrowing region being equal to or less than the length of the first lateral tooth situated inside of said narrowing region, wherein the slow light waveguide also comprises:

an initial region which extends, along the optical axis, over a distance greater than $d_{min}$, from a start starting from which the width of the central waveguide begins to continuously decrease up to an end beyond which the width of the central waveguide no longer decreases up to the end of the slowing section, said initial region overlapping the broadening region over a non-zero distance greater than $d_{min}$, a final region which extends, along the optical axis, over a distance greater than $d_{min}$, from a start starting from which the width of the central waveguide begins to continuously increase up to an end beyond which the width of the central waveguide no longer increases, said final region overlapping the narrowing region over a non-zero distance greater than $d_{min}$.

2. The waveguide according to claim 1, wherein the length of the slowing section between its start and its end is greater than 15 μm or 50 μm.

3. The waveguide according to claim 1, wherein the angle between the direction of extension of each lateral tooth and the optical axis is in the range between 85° and 95°.

4. The waveguide according to claim 1, wherein the slow light waveguide comprises an intermediate region which extends along the optical axis over a distance greater than $d_{min}$ from a start coinciding with the end of the broadening region up to an end coinciding with the start of the narrowing region, the length of the teeth inside of said intermediate region being constant.

5. The waveguide according to claim 1, wherein the slow light waveguide comprises a central region which extends along the optical axis over a distance greater than $d_{min}$ from a start coinciding with the end of the initial region up to an end coinciding with the start of the final region, the width of the central waveguide inside of said central region being constant.

6. The waveguide according to claim 1, wherein the end of the broadening region coincides with the start of the narrowing region and the end of the initial region coincides with the start of the final region.

7. The waveguide according to claim 1, wherein the width of the central waveguide is twice as big at the start of the initial region than at the end of said initial region, and the width of the central waveguide is half as big as at the start of the final region than at the end of the final region.

8. The waveguide according to claim 1, wherein the ratio S1/S2 is in the range between 0.25 and 0.75, where:
   S1 is the surface area of the orthogonal projection of the slowing section on the substrate plane, and
   S2 is the surface area of the smallest convex envelope which totally contains the orthogonal projection of the slowing section.

9. The waveguide according to claim 1, wherein:
   the pitch p is strictly less than $\lambda/n_{eff}$, where $\lambda$ is the wavelength of the optical signal and $n_{eff}$ is the effective index of propagation of the optical signal propagating within said slow light waveguide,
   the direction of extension of each lateral tooth forms a constant angle with the optical axis,
   the lateral sidewalls of the central waveguide are disposed symmetrically on either side of the optical axis.

10. The waveguide according to claim 1, wherein:
    the slow light waveguide comprises a heater designed to heat the central waveguide to a desired temperature in response to an electrical control signal, and
    a control circuit designed to generate the electrical control signal which allows the central waveguide to be maintained at a temperature where the group index $n_g$ of the fundamental TE mode of the optical signal which is propagating in the central waveguide is greater than or equal to eight.

11. A semiconductor modulator of the phase or of the amplitude of an optical signal, said modulator comprising:
    a slow light waveguide, and
    a controllable device designed to make the density of the free charge carriers inside of the slow light waveguide vary in response to an electrical control signal for modulating the phase or the amplitude of the optical signal,
    wherein the slow light waveguide is according to claim 1.

12. The semiconductor modulator according to claim 11, wherein the central waveguide comprises at least one PN or PIN junction and the modulator comprises contact areas intended for applying a potential difference on either side of said PN or PIN junction so as to make the density of the charge carriers inside of the central waveguide vary in response to an electrical control signal.

\* \* \* \* \*